US010236699B2

(12) United States Patent
Olson et al.

(10) Patent No.: US 10,236,699 B2
(45) Date of Patent: Mar. 19, 2019

(54) DEVICE CHARGING SYSTEM

(71) Applicant: Logitech Europe S.A, Lausanne (CH)

(72) Inventors: Alan Olson, Newark, CA (US); William Christopher Carmichael, Vancouver, WA (US); Dominic Amae, Vancouver, WA (US); Alexander S. Danielson, Vancouver, WA (US); Donald Robert Mayette, Vancouver, WA (US); Steven Ryutaro Takayama, Menlo Park, CA (US); Branko Lukic, Menlo Park, CA (US); Kevin James Kilpatrick, Mountain View, CA (US); Patrick Nicolet, Moutain View, CA (US); Gabriel Antonio Ulloa, Vancouver, WA (US)

(73) Assignee: LOGITECH EUROPE, S.A., Lausanne (CH)

( * ) Notice: Subject to any disclaimer, the term of this patent is extended or adjusted under 35 U.S.C. 154(b) by 283 days.

(21) Appl. No.: 15/238,381

(22) Filed: Aug. 16, 2016

(65) Prior Publication Data

US 2018/0054073 A1    Feb. 22, 2018

(51) Int. Cl.
*H02J 7/00*     (2006.01)
*H01R 13/631*   (2006.01)
(Continued)

(52) U.S. Cl.
CPC .......... *H02J 7/0045* (2013.01); *H01R 13/629* (2013.01); *H01R 13/631* (2013.01); *H01R 24/68* (2013.01); *G06F 1/1632* (2013.01); *H01R 13/22* (2013.01); *H01R 13/622* (2013.01); *H01R 31/06* (2013.01)

(58) Field of Classification Search
USPC ....................................................... 320/107
See application file for complete search history.

(56) References Cited

U.S. PATENT DOCUMENTS

| | | | | |
|---|---|---|---|---|
| 5,686,810 A | * | 11/1997 | Yasui | H01M 10/46 320/107 |
| 8,665,335 B2 | * | 3/2014 | Komiyama | H04N 1/00278 348/207.1 |
| 2010/0317233 A1 | * | 12/2010 | Koh | H01R 13/22 439/626 |

FOREIGN PATENT DOCUMENTS

| | | |
|---|---|---|
| EP | 2006959 A2 | 12/2008 |
| WO | 2009082181 A2 | 7/2009 |

OTHER PUBLICATIONS

International Search Report dated Nov. 20, 2017 for Application No. PCT/IB2017/000981.

* cited by examiner

*Primary Examiner* — Samuel Berhanu
(74) *Attorney, Agent, or Firm* — Patterson & Sheridan, LLP

(57) ABSTRACT

A charging stand is provided including a body having a first surface, and a bump having a top region and one or more sides. The one or more sides extend between the first surface and the top region. The charging stand further includes one or more base contact pins that are coupled to the body. Each base contact pin has an exposed end disposed at a first distance in a first direction from the first surface. The charging stand further includes a bump contact pin extending from the top region of the bump. The bump contact pin has an exposed end disposed a second distance in the first direction from the first surface, the second distance is greater than the first distance, and the first direction is perpendicular to the first surface.

12 Claims, 8 Drawing Sheets

(51) Int. Cl.
  *H01R 24/68*   (2011.01)
  *H01R 13/629*  (2006.01)
  *G06F 1/16*        (2006.01)
  *H01R 13/22*       (2006.01)
  *H01R 13/622*      (2006.01)
  *H01R 31/06*       (2006.01)

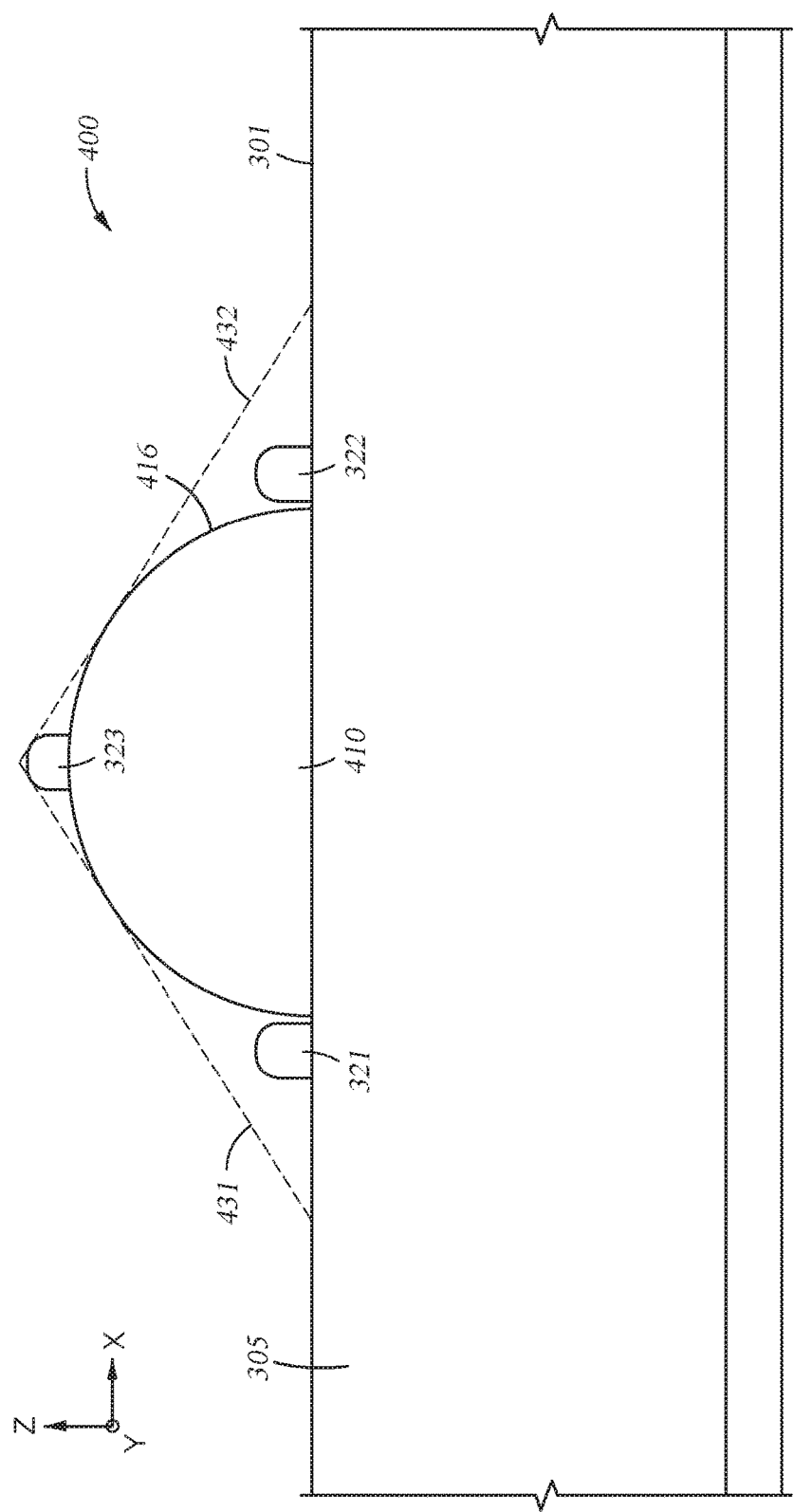

DEVICE CHARGING SYSTEM

BACKGROUND

Field

Embodiments of the present disclosure generally relate to a charging system for an electronic device.

Description of the Related Art

Portable electronic devices are often powered by a rechargeable power source, such as a rechargeable battery. There are numerous ways to recharge portable electrical and electronic devices including one of the most common methods of inserting a plug into a charging port of the portable electronic device. While inserting a plug into a charging port of a portable electronic device is not very difficult, the process can still be inconvenient and often requires the user to use two hands to complete the process.

Another method for recharging a portable electronic device is to use a charging stand in which the portable electronic device is placed on the charging stand, so that electrical contacts on the portable electronic device make a connection with electrical contacts on the charging stand in order to recharge the portable electronic device. While using a charging stand can simplify the recharging process for the user, the user still has to align the electrical contacts of the portable electronic device with the electrical contacts of the charging stand. Furthermore, a slight misalignment between the electrical contacts of the portable electronic device and the electrical contacts of the charging stand can prevent recharging from occurring, which can cause the portable electronic device to be uncharged when the user attempts to use the portable electronic device.

Therefore, there is a need for a charging system that overcomes the deficiencies of existing charging systems described above.

SUMMARY

Embodiments of the present disclosure generally relate to a charging system for an electronic device and components of the charging system, such as a charging stand and an electrical connector for connecting an electronic device to the charging stand.

In one embodiment, a charging stand is provided including a body having a first surface, and a bump having a top region and one or more sides. The one or more sides extend between the first surface and the top region. The charging stand further includes one or more base contact pins that are coupled to the body. Each base contact pin has an exposed end disposed at a first distance in a first direction from the first surface. The charging stand further includes a bump contact pin extending from the top region of the bump. The bump contact pin has an exposed end disposed a second distance in the first direction from the first surface, the second distance is greater than the first distance, and the first direction is perpendicular to the first surface.

In another embodiment, an electronic device is provided including a housing enclosing an interior region. The housing includes an opening. The electronic device further includes an onboard power source. The electronic device further includes an electrical connector disposed in the opening. The electrical connector includes a first portion extending outward through the opening. The first portion includes a core; an outer body disposed around the core, the outer body having a base; an inner recess wherein the outer body is disposed around the inner recess; and an electrical contact disposed in the inner recess. The electronic device further includes a second portion extending into the interior region of the housing. The first portion is removably connected to the second portion, and the second portion electrically connects the first portion to the onboard power source.

In another embodiment, an electrical charging system is provided including and electronic device and a charging stand. The electronic device includes a housing enclosing an interior region. The housing includes an opening. The electronic device further includes an onboard power source; and an electrical connector disposed in the opening. The electrical connector includes: a core; an outer body disposed around the core, and the outer body having a base; an inner recess wherein the outer body is disposed around the inner recess; and an electrical contact disposed in the inner recess, wherein the electrical contact is electrically isolated from the outer body. The charging stand includes a body having a first surface; a bump having a top region and one or more sides, wherein the one or more sides extend between the first surface and the top region. The charging stand further includes one or more base contact pins that are coupled to the body, each base contact pin having an exposed end disposed at a first distance in a first direction from the first surface. The charging stand further includes a bump contact pin extending from the top region of the bump. The bump contact pin has an exposed end disposed a second distance in the first direction from the first surface. The second distance is greater than the first direction. The first direction is perpendicular to the first surface. The bump contact pin contacts the electrical contact disposed in the inner recess when the outer body is disposed over the bump.

In another embodiment, an electrical charging system is provided. The electrical charging system includes an electronic device and a charging stand. The electronic device includes a housing enclosing an interior region, the housing including an opening. The electronic device further includes an onboard power source and an electrical connector disposed in the opening. The electrical connector includes a first portion extending outward through the opening. The first portion includes a core; an outer body disposed around the core, the outer body having a base; an inner recess wherein the outer body is disposed around the inner recess; and an electrical contact disposed in the inner recess. The electrical connector further includes a second portion extending into the interior region of the housing, the first portion removably connected to second portion, wherein second portion electrically connects the first portion to the onboard power source. The charging stand includes a body having a first surface; a bump having a top region and one or more sides, the one or more sides extending between the first surface and the top region; one or more base contact pins that are coupled to the body, each base contact pin having an exposed end disposed at a first distance in a first direction from the first surface; a bump contact pin extending from the top region of the bump, wherein the bump contact pin has an exposed end disposed a second distance in the first direction from the first surface, the second distance is greater than the first direction, the first direction is perpendicular to the first surface, and the bump contact pin contacts the electrical contact disposed in the inner recess.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 2 is a side cross-sectional view of portions of a charging stand, according to another embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a charging system for an electronic device. The embodiments disclosed improve the process of charging an electronic device by simplifying the user's experience to recharge the electronic device while providing a mechanically and electrically stable and reliable charging system.

Figure 1A:
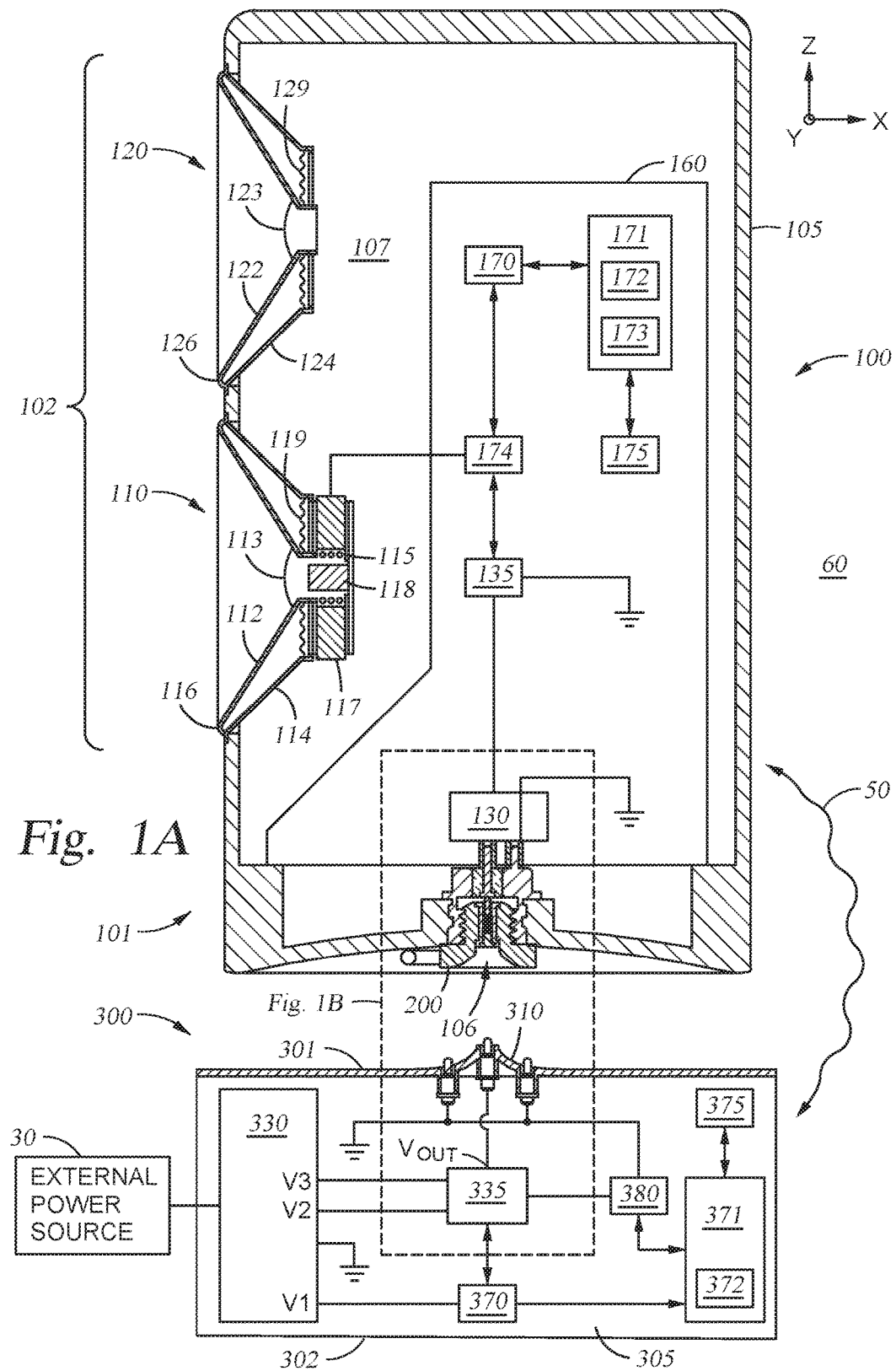
FIG. 1A is a side cross-sectional view of an electrical charging system, according to one embodiment.
Figure 1B:
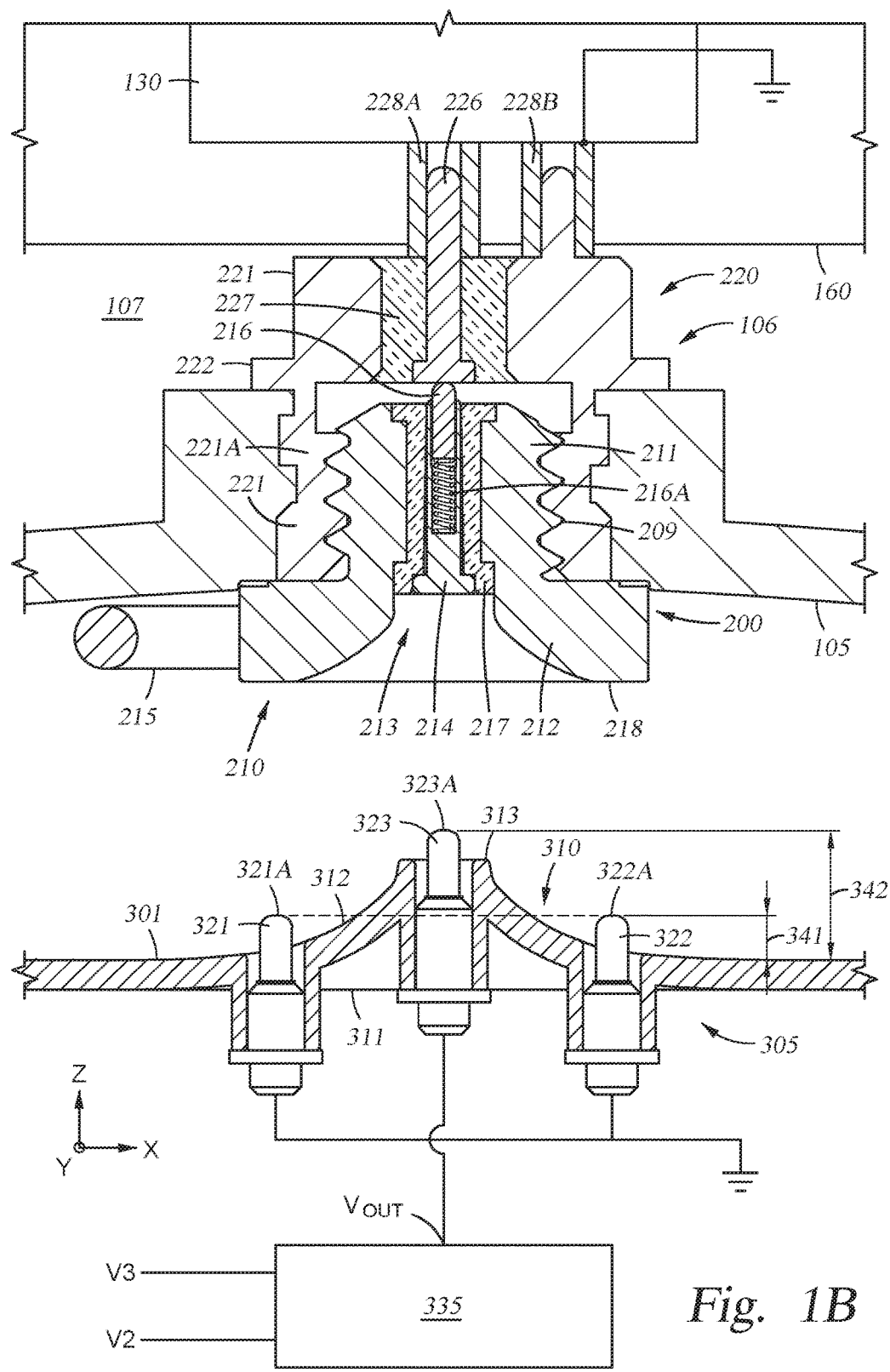
FIG. 1B is a close-up side cross-sectional view of portions of a charging stand and an audio speaker enclosed in dashed box 1B of FIG. 1A, where the electrical connection is made between the charging stand and an electrical connector of the audio speaker.
Figure 1C:
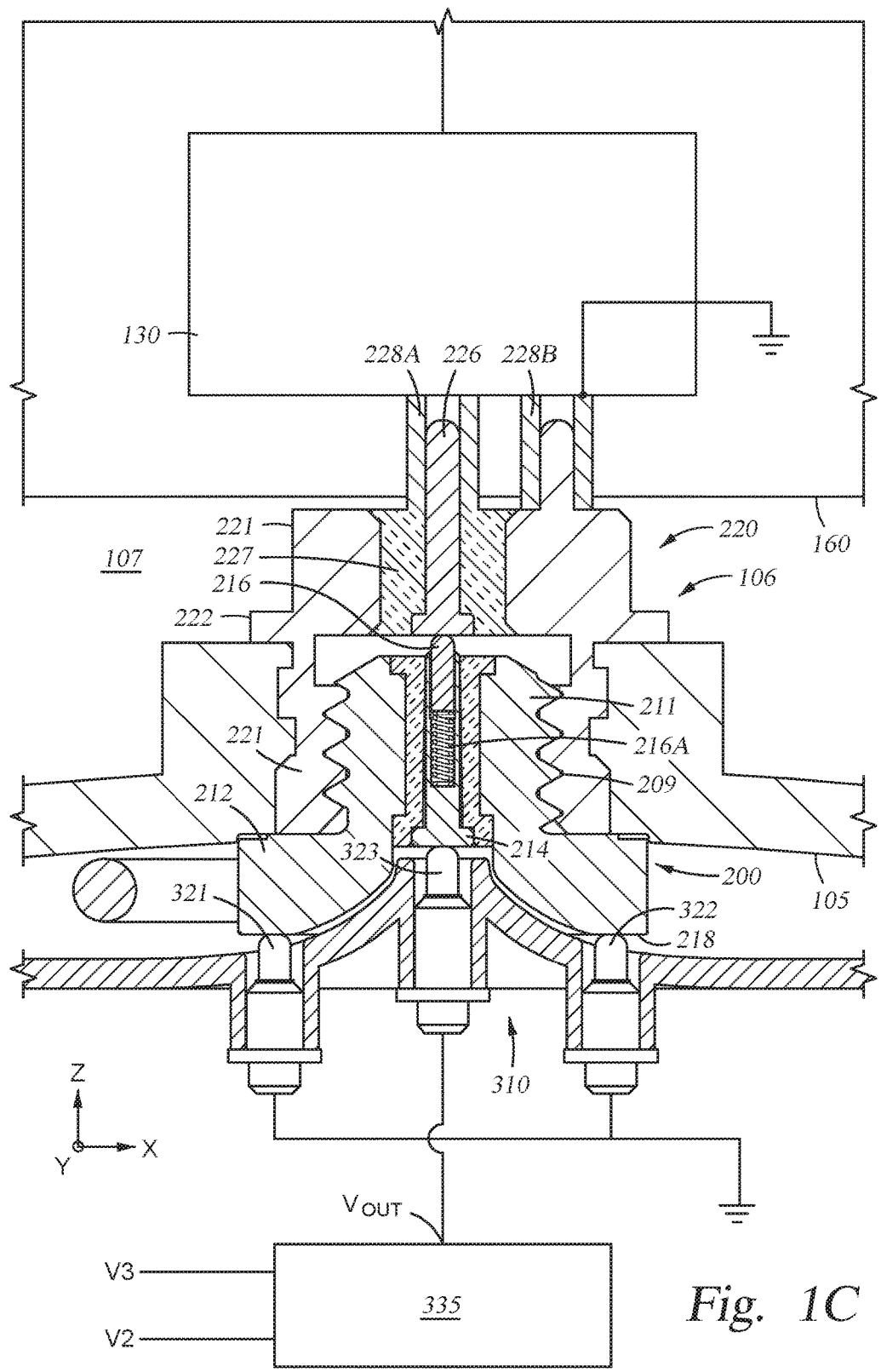
FIG. 1C is a close-up side cross-sectional view of the portions of the charging stand and the audio speaker shown in FIG. 1B after the audio speaker has been placed on the charging stand.
Figure 1D:
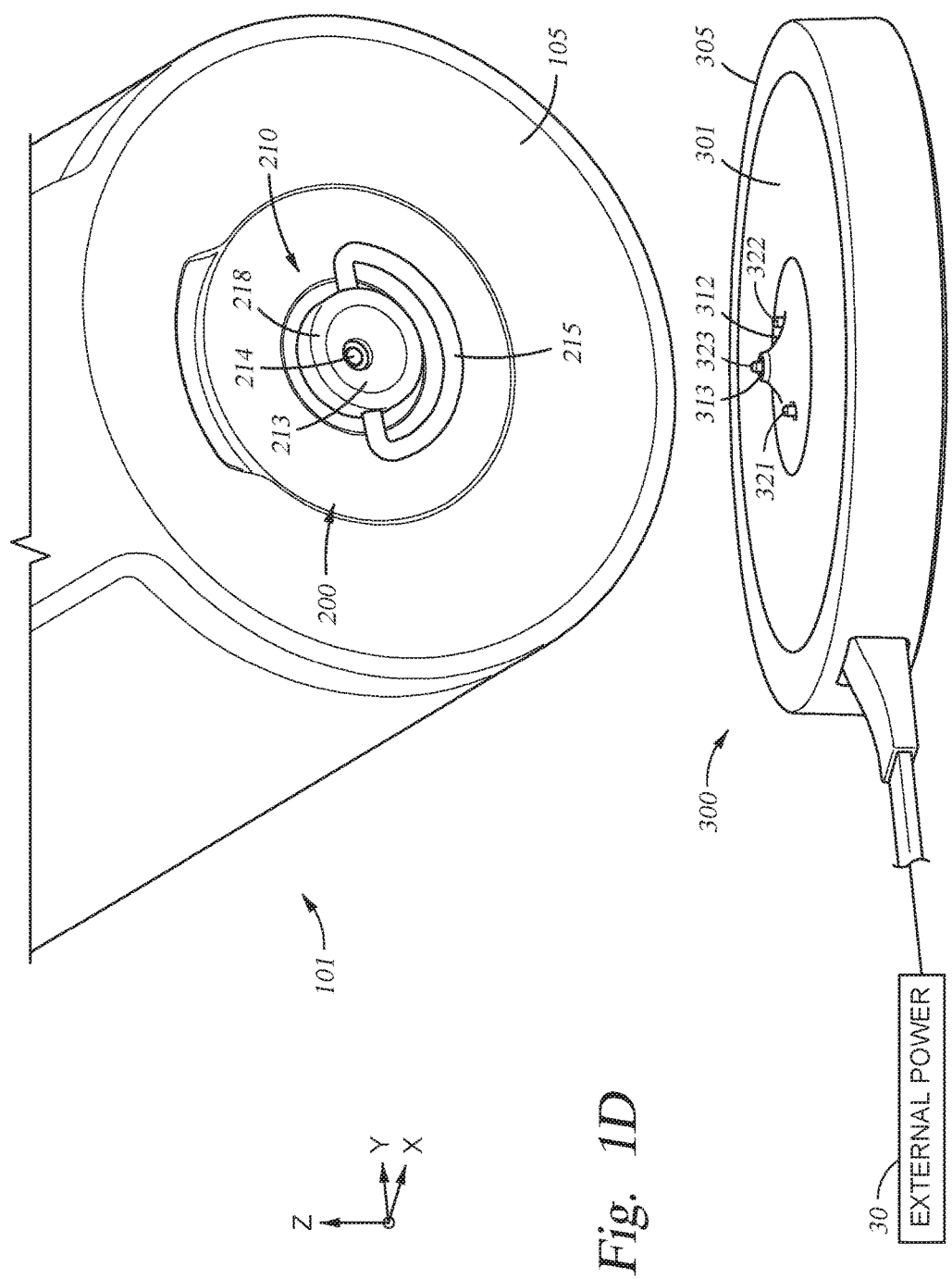
FIG. 1D is a perspective view of the charging stand and the audio speaker of FIG. 1A.

FIG. 1A is a side cross-sectional view of an electrical charging system 100, according to one embodiment. The electrical charging system 100 includes a charging stand 300 and an audio speaker 101 (electronic device) including an electrical connector 200. FIG. 1B is a close-up cross-sectional view of portions of the charging stand 300 and the audio speaker 101 enclosed in dashed box 1B of FIG. 1A, where the electrical connection is made between the charging stand 300 and the electrical connector 200 of the audio speaker 101, according to one embodiment. FIG. 1C is a close-up side cross-sectional view of the portions of the charging stand 300 and the audio speaker 101 shown in FIG. 1B after the audio speaker 101 has been placed on the charging stand 300, according to one embodiment. FIG. 1D is a perspective view of the charging stand 300 and the audio speaker 101, according to one embodiment. Although an audio speaker 101 is used as an exemplary electronic device for the embodiments disclosed herein, one skilled in the art would understand that numerous other rechargeable electrical and electronic devices may be designed to incorporate the beneficial features of this disclosure.

The Charging Stand

Referring to FIGS. 1A-1D, the charging stand 300 is described. The charging stand 300 can be used to provide electrical power to the audio speaker 101 through the electrical connector 200 in order to recharge an onboard power source 135 (e.g., a battery) of the audio speaker 101. The charging stand 300 can receive external power from an external power source 30, such as an electrical outlet. For example, in one embodiment the charging stand 300 receives an AC voltage from the external power source 30 and converts the AC voltage to a DC voltage that is provided to the audio speaker 101 to recharge the onboard power source 135 of the audio speaker 101.

The charging stand 300 includes a body 305 having a first surface 301 and an opposing second surface 302. The second surface 302 can be a flat surface that can be placed on a corresponding external flat surface, such as a floor or a top surface of a table, desk, countertop, or shelf. However, in some embodiments, the second surface 302 of the charging stand 300 may also be placed on surfaces that have other orientations, such as a vertical surface (e.g., a wall). For example, in one embodiment the charging stand 300 can include an additional support (not shown) extending from the first surface 301 to provide support for the audio speaker 101 when the charging stand 300 is mounted on a vertical surface. For example, the additional support (not shown) may be a full or partial sleeve that has an opening that is slightly larger than the external surface of the audio speaker 101.

The charging stand 300 further includes a power supply circuit 330. The power supply circuit 330 can receive external power (e.g., 120 VAC power) from the external power source 30. The power supply circuit 330 can convert the received AC voltage into one or more DC voltages, which can be used to power the electronics of the charging stand 300 as well as supply power to the audio speaker 101. For example, the charging stand 300 can supply a first voltage V1 (e.g., 3 V) to the electronics of the charging stand, and either a second voltage V2 (e.g., 5 V) or a third voltage V3 (e.g., 12 V) to the audio speaker 101. In some embodiments, the third voltage V3 is higher than the second voltage V2, and the charging stand 300 can switch the voltage supplied to the audio speaker 101 to the higher voltage V3 in order to more rapidly recharge the onboard power source 135 of the audio speaker 101.

The electronics of the charging stand 300 can include a processor 370, a memory unit 371, one or more transceivers 375, one or more sensors 380, and a switching device 335 each of which can be connected to the power supply circuit 330. The memory unit 371 may include one or more software applications 372. The processor 370 may be a hardware unit or combination of hardware units capable of executing software applications and processing data. In some configurations, the processor 370 includes a central processing unit (CPU), a digital signal processor (DSP), an application-specific integrated circuit (ASIC), and/or a combination of such units. The processor 370 is generally configured to execute the one or more software applications 372 included within memory unit 371.

The memory unit 371 may be any technically feasible type of hardware unit configured to store data. For example, the memory unit 371 could be a hard disk, a random access memory (RAM) module, a flash memory unit, or a combination of different hardware units configured to store data. The software application 372, which is stored within the memory unit 371, includes program code that may be executed by processor 370 in order to perform various functionalities associated with the charging stand 300, such as software for communicating to the audio speaker 101 and software for controlling the power supplied by the power supply circuit 330 to the audio speaker 101.

The one or more transceivers 375 may include one or more transceivers configured to establish one or more different types of wireless communication links, such as a Bluetooth, NFC or Wi-Fi type of communication link, with other transceivers residing within other computing devices found within the external region 60, such as audio speaker 101. However, in some embodiments the one or more transceivers 375 can also be configured to establish one or more different types of wired communication links.

The switching device 335 can be used to control the power provided to the audio speaker 101. The switching device 335 can be, for example, a relay or a solid state switch. The switching device 335 receives two input voltages V2, V3 and provides one output voltage Vout to be supplied to the audio speaker 101. Furthermore, during some times the switching device 335 may also electrically disconnect from both input voltages V2, V3, so that no voltage is supplied to the output of the switching device 335. For example, in one embodiment the one or more sensors 380 in the charging stand 300 may include one or more physical position sensors (not shown), such as a pressure or proximity sensor to determine when the audio speaker 101 is placed on the charging stand 300, and Vout can be maintained at 0 V until the audio speaker 101 is sensed by the charging stand 300. Furthermore, the one or more sensors 380 may include one or more sensors to determine when the charging stand 300 is actively charging the audio speaker 101. For example, in one embodiment, the one or more sensors 380 may include one or more current measuring sensors (e.g., a current sensing amplifier or ammeter) to detect the current flowing from the switching device 335 to the bump contact pin 323 (described below). Thus, although FIG. 1A shows a single box for the one or more sensors 380, the one or more sensors may be disposed at various locations in the charging stand 300. Furthermore, in some embodiments, one or more of the one or more sensors 380 or additional sensors may be placed in the audio speaker 101 and the audio speaker 101 can provide the sensor status and/or data to the charging stand 300.

The processor 370 or I/O connected to the processor 370 can send a signal to the switching device 335 causing the output voltage Vout to switch between the second voltage V2, the third voltage V3, or no voltage based on execution of the software application 372 in the memory unit 371. In one embodiment, through execution of the software application 372, the charging stand 300 can initially provide 0 V, then provide the second voltage V2 when the audio speaker 101 is physically sensed by one of the one or more sensors, and then after receiving confirmation from the audio speaker 101 (e.g., confirmation received over a wireless connection) that the audio speaker 101 is actively recharging or that the current detected by one of the one or more sensors 380 is within an expected range, the charging stand 300 can then provide the third voltage V3 as the output voltage Vout to more rapidly recharge the power source 135 in the audio speaker 101.

The charging stand 300 further includes a protruding region, or raised region, that includes a bump 310 that has a base 311, one or more sides 312, and a top region 313. The one or more sides 312 extend between the first surface 301 and the top region 313. In some embodiments, the outer surface of the bump 310 is formed of a dielectric material that electrically isolates the various electrically conductive components disposed within the charging stand 300, such as one or more charging related electrical connection points from each other. In one example, the bump 310, and outer surface of the charging stand 300, is formed from a plastic material, such as ABS, polycarbonate, acrylic, polyethylene or other similar polymer containing material. The bump 310 extends from the base 311 at the first surface 301 to the top region 313. In some embodiments, the bump 310 can have a shape of a cone, a truncated cone, a hemisphere, a truncated hemisphere, a polygon, or a truncated polygon. For example, in FIG. 1B, the one or more sides 312 of the bump 310 between the first surface 301 and the top region 313 of the bump 310 form a truncated cone. The one or more electrical connection points in the charging stand 300 may include one or more base contact pins, such as a first contact pin 321 and a second contact pin 322 that are each coupled to the body 305, as shown in FIG. 1B. In some embodiments, the one or more base contact pins extend through first surface 301 and are spaced apart from the base 311 of the bump 310. In other embodiments, the one or more base contact pins are disposed through a portion of the base 311 of the bump 310 or partially through the first surface 301 and partially through the base 311 of the bump 310. The first contact pin 321 and the second contact pin 322 each have a corresponding exposed end 321A, 322A disposed at a first distance 341 in the Z-direction from the first surface 301. The Z-direction can be perpendicular to the first surface 301. Furthermore, the exposed ends 321A, 322A of the one or more base contact pins 321, 322 can be disposed on a plane that is substantially parallel to the first surface 301. The one or more base contact pins may each be connected to an electrical ground, such as the electrical ground of the power supply circuit 330. In some embodiments, the one or more base contact pins (e.g., contact pins 321, 322) may extend from a lower portion of the bump 310 proximate to the first surface 301.

The one or more electrical connection points in the charging stand 300 further includes a bump contact pin, such as the third contact pin 323 extending from the top region 313 of the bump 310. The third contact pin 323 has an exposed end 323A disposed at a second distance 342 in the Z-direction from the first surface 301. The second distance 342 is greater than the first distance 341. The third contact pin 323 may be electrically connected to the output voltage Vout of the switching device 335. The first contact pin 321 can be electrically connected to the second contact pin 322. The third contact pin 323 is electrically isolated from the first contact pin 321 and the second contact pin 322. In some embodiments, one or more of the contact pins 321-323 may each be spring loaded in the Z-direction (FIG. 1A) to ensure sufficient contact is reliably achieved between the pins 321-323 and their respective mating surfaces formed in the electrical connector 200 due to positional tolerance stack-up issues. Each of the spring loaded contact pins 321-323 may be similarly configured as the spring loaded portions (e.g., first portion conductor 216 and spring 216A) of the electrical contact 214, which are further described below. In some electrical configurations, the third contact pin 323 can be used to supply a charging voltage to the audio speaker 101 relative to the one or more base contact pins, such as the pins 321 and/or 322. One or more of the first contact pin 321 and the second contact pin 322 can be used to connect the electrical connector 200 to the ground of the power supply circuit 330 for charging of the audio speaker 101.

In some embodiments, such as the charging stand 400 described below, the one or more sides 312 of the bump 310 can have a convex surface, such as an embodiment in which the bump 310 has the shape of a hemisphere or truncated hemisphere. In such embodiments, the convex surface can position the third contact pin 323, so that the third contact pin 323 is not within a direct line of sight with the first contact pin 321 and the second contact pin 322. Positioning the third contact pin 323 out of the line of sight of the first contact pin 321 and the second contact pin 322 can be useful for preventing an inadvertent electrical short from being created between the third contact pin 323 and one or more of the first contact pin 321 and the second contact pin 322 when a foreign conductive object (e.g., a set of keys) is placed on the charging stand 300.

The Audio Speaker

Referring to FIG. 1A, the audio speaker 101 is described. The audio speaker 101 includes a housing 105, a circuit board 160, a speaker assembly 102, and the electrical connector 200, which was introduced above. The audio speaker 101 can be placed on or against the charging stand 300, so that electrical power can be provided by the charging stand 300 to the electrical connector 200 to recharge the power source 135 that is coupled to the electrical connector 200.

The housing 105 of the audio speaker 101 encloses an interior region 107 of the audio speaker 101 separating the interior region 107 of the housing 105 from an external region 60 outside the housing 105. The housing 105 includes an opening 106 for connecting external electrical power to the audio speaker 101. The electrical connector 200 can be positioned within the opening 106 to provide the conductive path between the external electrical power provided by the charging stand 300 and the power source 135 disposed in the audio speaker 101. The electrical connector 200 can also form part of a seal formed between the opening 106 and the electrical connector 200 within the housing 105. For example, the electrical connector 200 can be used to create a water-tight or air-tight seal with the opening 106. The housing 105 can be formed of, for example, acrylonitrile butadiene styrene (ABS), polycarbonate (PC), PC-ABS, nylon, styrene, acrylic, methyl methacrylate ABS or other similar structural material. In some embodiments, the electrical connector 200 may include one or more elastomeric seals (e.g., a gasket or a seal overmolded onto the electrical connector) to help form the seal between the electrical connector 200 and a surface of the opening 106 formed in the housing 105.

In some embodiments, the circuit board 160 can be a printed circuit board (PCB). In some embodiments, the circuit board 160 includes electronics and/or wiring for handling the signals between the audio speaker 101 and any external I/O (not shown) attached to the audio speaker 101. The circuit board 160 is also used to transfer signals to and from the speaker assembly 102.

In one embodiment, as shown in FIG. 1A, the circuit board 160 can further include electronics for operating the audio speaker 101. For example, the circuit board 160 can include a processor 170, a memory unit 171, one or more input/output (I/O) components 174, one or more transceivers 175, the onboard power source 135, and a charging circuit 130 for charging the onboard power source 135. The processor 170, the memory unit 171, the one or more I/O components 174, the one or more transceivers 175, and the charging circuit 130 may each be coupled to the onboard power source 135. Furthermore, at least the memory unit 171, the one or more I/O components 174, and the one or more transceivers 175 may each be coupled to the processor 170.

The memory unit 171 may include one or more software applications 172 and stored media data 173. Processor 170 may be a hardware unit or combination of hardware units capable of executing software applications and processing data, which may, for example, including the delivery of audio information from the audio speaker 101. In some configurations, the processor 170 includes a central processing unit (CPU), a digital signal processor (DSP), an application-specific integrated circuit (ASIC), and/or a combination of such units. The processor 170 is generally configured to execute the one or more software applications 172 and process the stored media data 173, which are each included within memory unit 171.

The memory unit 171 may be any technically feasible type of hardware unit configured to store data. For example, the memory unit 171 may include any type of non-volatile type memory device, such as a hard disk, a random access memory (RAM) module, a flash memory unit, or a combination of different hardware units configured to store data. The software application 172, which is stored within the memory unit 171, includes program code that may be executed by processor 170 in order to perform various functionalities associated with the audio speaker 101, such as communicating with the charging stand 300 and controlling the audio signals sent to the speaker assembly 102.

The I/O components 174 are coupled to processor 170 and may include components capable of receiving input and/or components capable of providing output. For example, the I/O components 174 are coupled to the speaker assembly 102, which is configured to generate an acoustic output. The one or more transceivers 175 can be configured to establish one or more different types of wireless communication links, such as a Bluetooth, NFC or Wi-Fi type of communication link, with other transceivers residing within other computing devices found within the external region 60, such as the one or more transceivers 375 within the charging stand 300. For example, FIG. 1A shows that the charging stand 300 and the audio speaker 101 can communicate over a wireless communication link 50. However, in some embodiments the one or more transceivers 175 may also include one or more transceivers configured to establish one or more different types of wired communication links with the charging stand 300 or other devices.

The speaker assembly 102 can include an active speaker assembly 110 and a passive speaker assembly 120 that can both be sealably mounted to the housing 105. The active speaker assembly 110 can be coupled to the circuit board 160. For example, the active speaker assembly 110 can receive audio signals from the I/O components 174 of the circuit board 160. The active speaker assembly 110 generally includes a sealed diaphragm 112, a frame 114, a sealed surround 116, a voice coil 115, a pole piece 118, a permanent magnet 117, a dust cover 113 and a spider 119. During operation, the I/O components 174 deliver a signal to the active speaker assembly 110, which causes the voice coil 115 to move the diaphragm 112 relative to the enclosure housing 105 (i.e., +/−X-direction) due to the varying magnetic field generated by the voice coil 115 reacting against the magnetic field provided by the permanent magnet 117. In some embodiments, the sealed diaphragm 112 includes a diaphragm layer and a coating layer that are configured to sealably enclose a portion of the interior region 107. The diaphragm layer may include a paper, polymer, metal or other material that is light weight and has a desired stiffness for the size of the audio speaker 101. The coating layer can includes a material (e.g., polymer) that is used to coat a surface of the sealed diaphragm 112 to assure that air or a liquid will not pass through the sealed diaphragm 112.

The passive speaker assembly 120 can be, for example, a passive radiator. Typically, the passive speaker assembly 120 is similar to the active speaker assembly 110 but does not include the active components, such as the voice coil, permanent magnet, and pole piece. The passive speaker assembly 120 generally includes a sealed diaphragm 122, a frame 124, a sealed surround 126, a dust cover 123 and a spider 129. The passive speaker assembly 120 moves in response to the changes in air pressure of the interior region 107 caused by the movements of the active speaker assembly 110.

The sound quality produced by the speaker assembly 102 can be directly related to how well the acoustic volume of the housing 105 is sealed. For example, if the housing 105 is poorly sealed, then the passive speaker assembly 120 will be prevented from producing a desired sound quality. Furthermore, the seals used in the audio speaker 101 can also be used to prevent the ingress of dirt and water into the interior region 107 of the housing 105. Dirt and water can damage the electronics of the audio speaker 101 as well as reduce the quality of sound produced by the audio speaker 101. Preventing the ingress of dirt and water is also important to meet the use requirements of active portable lifestyles of today, such as when the audio speaker 101 is being used outdoors and is potentially exposed to situations where the audio speaker 101 may become submerged in water or drenched during water related activities or rain. Thus, a compromised seal at any of the openings through the housing 105, such as at the locations of the speaker assembly 102 or the electrical connector 200 can lead to reduced sound quality or damage to the audio speaker 101. In this disclosure, the electrical connector 200 includes a number of features described in detail below to reduce the likelihood of reduced sound quality or damage to the audio speaker 101 that could be caused by a compromised seal at the opening 106 of the housing 105.

The onboard power source 135 may be a battery, super capacitor, or other similar energy storage device that is rechargeable. The charging circuit 130 can include electronic components to supply a controlled voltage and current to the power source 135 for recharging. For example, the charging circuit 130 can include electronic components to supply a constant current and/or constant voltage to the power source 135 during different periods of recharging the power source 135. In some embodiments, one or more components of the charging circuit 130 may also be located within the charging stand 300. The charging circuit 130 receives electrical power from the charging stand 300 through the electrical connector 200.

The Electrical Connector

Referring to FIGS. 1A-1D, the electrical connector 200 is described. The electrical connector 200 can include an interface portion 210 (e.g., first portion) and a connection portion 220 (e.g., second portion) (FIGS. 1B-1C). The interface portion 210 can extend outward through the opening 106 of the housing 105. The interface portion 210 includes a core 211. The core 211 is a central portion of the interface portion 210. For example, the core 211 can include threads or another mechanical feature for coupling the interface portion 210 to the connection portion 220. The interface portion further includes an outer body 212 disposed around the core 211. The outer body 212 can be configured to fit over and/or surround the bump 310 when the audio speaker 101 is being charged on the charging stand 300. The interface portion 210 further includes an optional frame 215 coupled to and disposed around the outer body 212. In some embodiments, the frame 215 can assist a user in coupling the interface portion 210 to the connecting portion 220. In some embodiments, the interface portion 210 and the connection portion 220 are largely fabricated from a metallic material, such as stainless steel, nickel or a nickel plated metal (e.g., nickel plated aluminum).

As shown in FIG. 1B, the outer body 212 includes a base 218. As shown in FIG. 1C, the base 218 can be placed on the first and second contact pins 321, 322 when the audio speaker 101 is placed on the charging stand 300. Thus, the base 218, which is electrically isolated from an electrical contact 214 within the core 211, can form part of the ground connection between the electrical connector 200 and the charging stand 300. In some embodiments, such as the embodiment shown in FIG. 1D, the base 218 can form a ring, such as a circular ring that fully surrounds the bump 310 when it is placed on the charging stand 300. Using the base 218 that fully surrounds the bump 310 alleviates the need for the user to align the audio speaker 101 with the charging stand 300 in angular direction about the Z-axis. Also, because the base 218 completely surrounds the bump 310, the likelihood of the electrical connector 200 failing to make electrical contact with at least one the contact pins 321, 322 is significantly reduced. FIG. 1C shows an example of the electrical contact between the base 218 and the contact pins 321, 322. Thus, the risk a user attempting to charge the audio speaker 101, but failing to charge the audio speaker 101 due to a slight misalignment between the electrical connector 200 and the charging stand 300 is also significantly reduced. Furthermore, the base 218 being an integral part of the interface portion 210 has a robust structure that is unlikely to suffer significant wear and tear over the lifetime of the charging system 100.

The interface portion 210 further includes an inner recess 213. The outer body 212 is disposed around the inner recess 213. The inner recess 213 forms a cavity that can be placed over the bump 310 when the audio speaker 101 is placed on the charging stand 300 allowing electrical contact to be made between an electrical contact 214 of the interface portion 210 of the electrical connector 200 and the third contact pin 323, and between the base 218 of the interface portion 210 and one or more of the first and second contact pins 321, 322. The shape of the inner recess 213 can substantially match the exterior shape of the bump 310. For example, in FIG. 1B the bump 310 and the inner recess 213 each have a shape primarily of a truncated cone. In some configurations, the matching truncated cone portions of the inner recess 213 and the bump 310 may further include a cylindrical portion disposed near the top of the bump 310 and a cylindrical portion of the inner recess 213, which is formed near an electrical contact 214 described below.

The interface portion 210 includes an electrical contact 214 disposed in the inner recess 213, a first portion conductor 216, and a first portion insulation 217. The electrical contact 214 or outer surface of the electrical contact 214 can be formed of silver, gold, copper, platinum, or an alloy thereof. As shown in FIG. 1C, the electrical contact 214 is positioned to contact the third contact pin 323 when the audio speaker 101 is placed on the charging stand 300. The electrical contact 214 is connected to the first portion conductor 216. The first portion insulation 217 is disposed around the electrical contact 214 and the first portion conductor 216 to electrically isolate the electrical contact 214 and the first portion conductor 216 from the core 211, the outer body 212, and the frame 215. Conversely, the core 211, the outer body 212, and the frame 215 are each electrically connected to each other. Furthermore, in some embodiments, the core 211 and the outer body 212 can be formed of the same block of material.

In some embodiments, an injection molding or over overmolding process can be used to mold the first portion insulation 217 around the first portion conductor 216 creating a water-tight and air-tight seal in the space between the first portion conductor 216 and the core 211 as well as the space between electrical contact 214 and the outer body 212. Using an injection molding or overmolding process can help maintain the integrity of the seal formed by the first portion insulation 217 relative to a press-fit insulation portion. For example, an injection molded or overmolded first portion insulation 217 can maintain a seal better than a corresponding press-fit insulation portion after repeated exposure to mechanical stresses and other stresses, such as changes in temperature. Thus, the injection molded or overmolded first portion insulation 217 can help maintain desired sound quality and prevent damage to the audio speaker 101 due to ingress of moisture, dirt, or other contaminants through the opening 106 of the housing 105. Furthermore, an injection molded or overmolded first portion insulation 217 can help prevent the electrical contact 214 from disconnecting from the first portion conductor 216, such as a disconnection caused by repeated contact with the bump contact pin 323 or exposure to another external stress.

In some embodiments, the optional frame 215 can have a shape of a partial ring or full ring around the outer body 212. In some embodiments, the frame 215 can surround at least half of the outer body 212. For example, FIG. 1D shows the frame 215 having a shape of a D-shaped ring. The frame 215 can be rotatable about the Y-axis and can be used to help a user connect and disconnect the interface portion 210 to and from the connection portion 220.

The interface portion 210 is removably connected to the connection portion 220 at a connection point 209. The connection point 209 between the interface portion 210 and the connection portion 220 creates a mechanical and electrical connection between the two portions 210, 220. In the embodiment shown in FIG. 1B, the connection point 209 is a threaded connection in which the interface portion 210 has external threads and the connection portion 220 has internal threads to receive the external threads of the interface portion 210. In one configuration, the threads on one or more of the interface portion 210 and the connection portion 220 can be tapered to help seal the interface portion 210 to the connection portion 220 at the connection point 209. In another configuration, the threads of interface portion 210 and the connection portion 220 can be a standard straight thread (e.g., ¼-20 UNC or ⅜-16 UNC thread) allowing for the audio speaker to be connected to other types of equipment, such as equipment other than the interface portion 210 and/or charging stand 300. For example, in one embodiment the interface portion 210 can be removed and the connection portion 220 can then be secured to external threads of a speaker tripod or other speaker support for an improved audio experience for the user. Although a threaded connection is shown, other types of connections may also be used to form the connection point 209 between the interface portion 210 and the connection portion 220.

The connection portion 220 of the electrical connector 200 extends into the interior region 107 of the housing 105. In FIG. 1B, the parts of the electrical connector 200 included in the connection portion 220 are shown filled with a hatched pattern unless otherwise specified to distinguish these parts from the parts included in the interface portion 210. The connection portion 220 can include a core 221 and a flange 222 disposed around the core 221. In some embodiments, the flange 222 can contact the housing 105 to form part of the seal between the interior region 107 of the housing 105 and the external region 60. In other embodiments, a separate sealing material (e.g., a gasket or an elastomeric material overmolded onto the flange 222) may be placed between the flange 222 and the housing 105. In some embodiments, portions of the housing 105 can surround relieved portions 221A of the core 221 to help form a reliable seal and also support the connection portion 220 when the threaded portion of the interface portion 210 is inserted within the connection point 209. In either configuration, the core 221, and/or flange 222, and mating portion of the housing 105 form a seal that prevents gases or liquids from moving between the external region 60 and interior region 107. Furthermore, in some embodiments the flange 222 may include a notch (not shown), and the audio speaker 101 may include a corresponding tab or other projection (e.g., a tab extending from the housing 105) to be positioned in the notch to prevent any rotation of the flange 222 relative to the housing 105 about the Z-axis. Rotation of the flange 222 relative to the housing 105 could disrupt the seal formed between the outside surface of the electrical connector 200 and the housing 105.

The connection portion 220 further includes a second portion conductor 226, and a second portion insulation 227. In FIGS. 1B-1C, the second portion insulation 227 is hatched so that the second portion insulation 227 can be easily distinguished from the second portion conductor 226. The second portion conductor 226 can be electrically connected to the first portion conductor 216 when the external threads of the interface portion 210 are threaded into the internal threads of the connection portion 220 at the connection point 209. In some embodiments, the interface portion 210 can include a pin and the connection portion 220 can include an electrical contact, which may be similar to the electrical contact 214 described above, to ensure sufficient electrical connection between the first portion conductor 216 and the second portion conductor 226 when the threaded connection is made. In some embodiments, the first portion conductor 216 is spring loaded by a spring 216A in the Z-direction (FIG. 1B) to ensure sufficient contact is reliably achieved between the first portion conductor 216 and the second portion conductor 226 due to positional tolerance stack-up issues created between these components.

The second portion insulation 227 is disposed around the second portion conductor 226 to electrically isolate the second portion conductor 226 from the core 221 and the flange 222. Conversely, the core 221 and the flange 222 are each electrically connected to each other, and/or are formed from the same block of material. Furthermore, when the threaded connection is made at the connection point 209, the core 221 can be electrically connected to the core 211 and/or to the outer body 212 of the interface portion 210. In some embodiments, an injection molding over overmolding process can be used to mold the second portion insulation 227 around the second portion conductor 226 creating a water-tight and air-tight seal in the space between the second portion conductor 226 and the core 221 as well as the space between the second portion conductor 226 and the flange 222. Thus, the second portion conductor 226, second portion insulation 227 and core 221 form a sealed assembly that prevents gases or liquids from moving through a central region of the connection portion 220 between the external region 60 and interior region 107.

The second portion conductor 226 can be electrically connected to a positive terminal 228A (FIG. 1B) of the charging circuit 130 while the core 221 or the flange 222 can be electrically connected to the ground terminal 228B (FIG. 1B) of the charging circuit 130. Thus, when the threaded connection is made at the connection point 209, and the electrical connector 200 is placed over the bump 310 so that the electrical contact 214 contacts the third contact pin 323 and the base 218 contacts one or more of the first and second contact pins 321, 322, then power can flow from the power supply circuit 330 through the respective contact pins 321-323, through the electrical connector 200, and through the charging circuit 130 to charge the power source 135 in the audio speaker 101. In some embodiments, the charging circuit 130 is formed on a surface of the circuit board 160, as schematically illustrated in FIG. 1B.

Figure 1E:
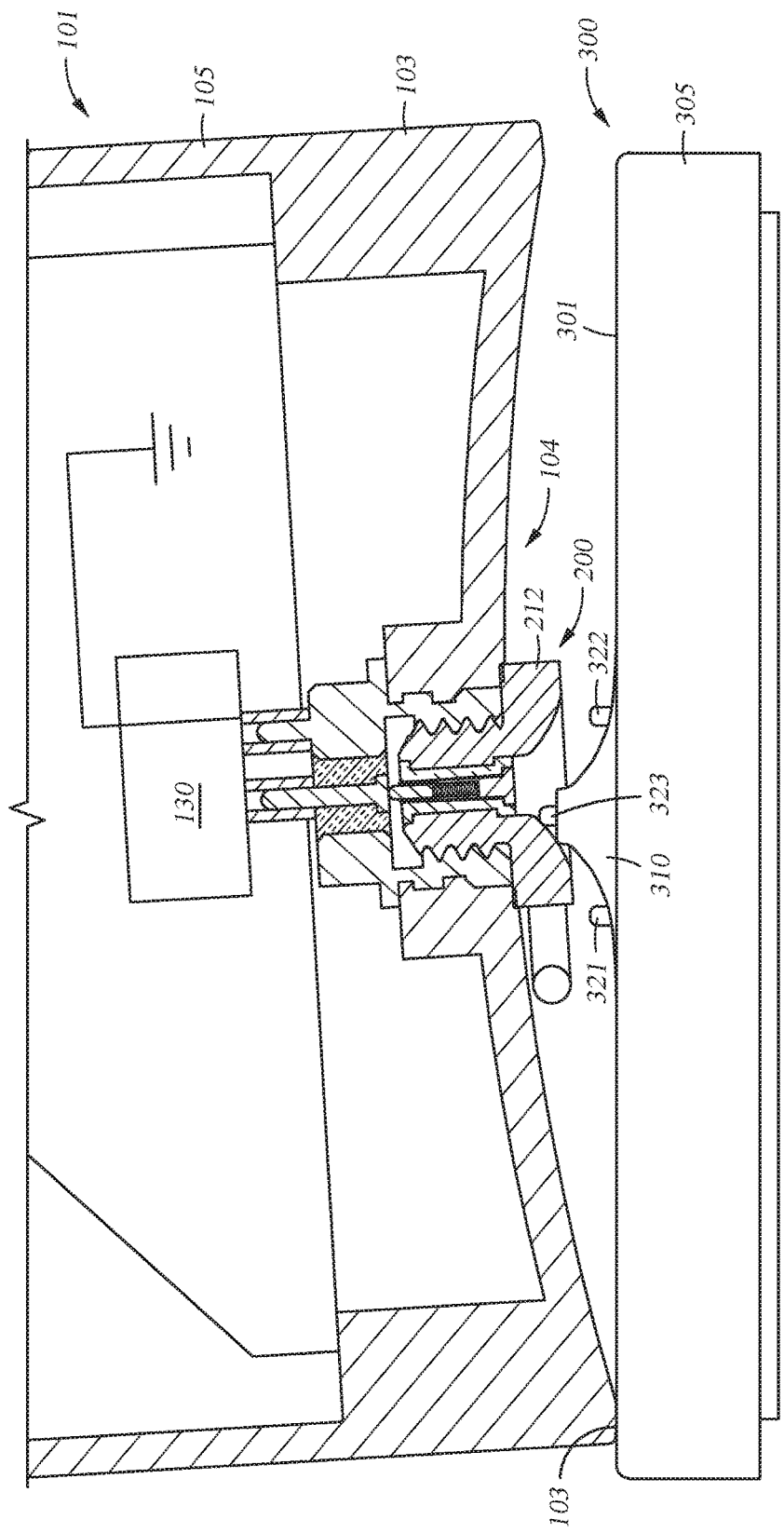
FIG. 1E is a side cross-sectional view of the portions of the charging stand and the audio speaker after the audio speaker has been placed on the charging stand, according to one embodiment.

FIG. 1E is a side cross-sectional view of portions of the charging stand 300 and the audio speaker 101 after the audio speaker 101 has been placed on the charging stand 300, according to one embodiment. In FIG. 1E, the electrical connector 200 of the audio speaker 101 is not aligned properly with the bump 310 of the charging stand 300. Despite being improperly aligned, the outer body 212 of the electrical connector 200 is unable to contact both the first contact pin 321 and the third contact pin 323, which prevents a short circuit between the third contact pin 323 and the first contact pin 321. In this embodiment, the electrical connector 200 is disposed in a recess 104 formed in the housing 105. In this configuration, the structural shape of the recess 104 and position of the electrical connector 200 on the housing 105 causes an outer portion 103 of the recess 104 portion of the housing 105 to contact the first surface 301 of the body 305 of the charging stand 300 in an effort to physically prevent portions of the outer body 212 of the electrical connector 200 from contacting one of the base contact pins (e.g. first contact pin 321 in FIG. 1E) and the third contact pin 323 simultaneously. The recess 104 and the outer portion 103 can be symmetrical about the Z-axis, so that the structural shape of the recess 104 and the outer portion 103 can also prevent the outer body 212 of the electrical connector 200 from contacting the second contact pin 322 and the third contact pin 323 simultaneously. Use of the recess 104 and the outer portion 103 is one example of a design for how the outer body 212 can be prevented from short circuiting the first or second contact pins 321, 322 and the third contact pin 323. However, one skilled in the art could make modifications to the disclosure herein to develop other ways to prevent the outer body 212 from contacting the first or second contact pins 321, 322 and the third contact pin 323 simultaneously.

Figure 1F:
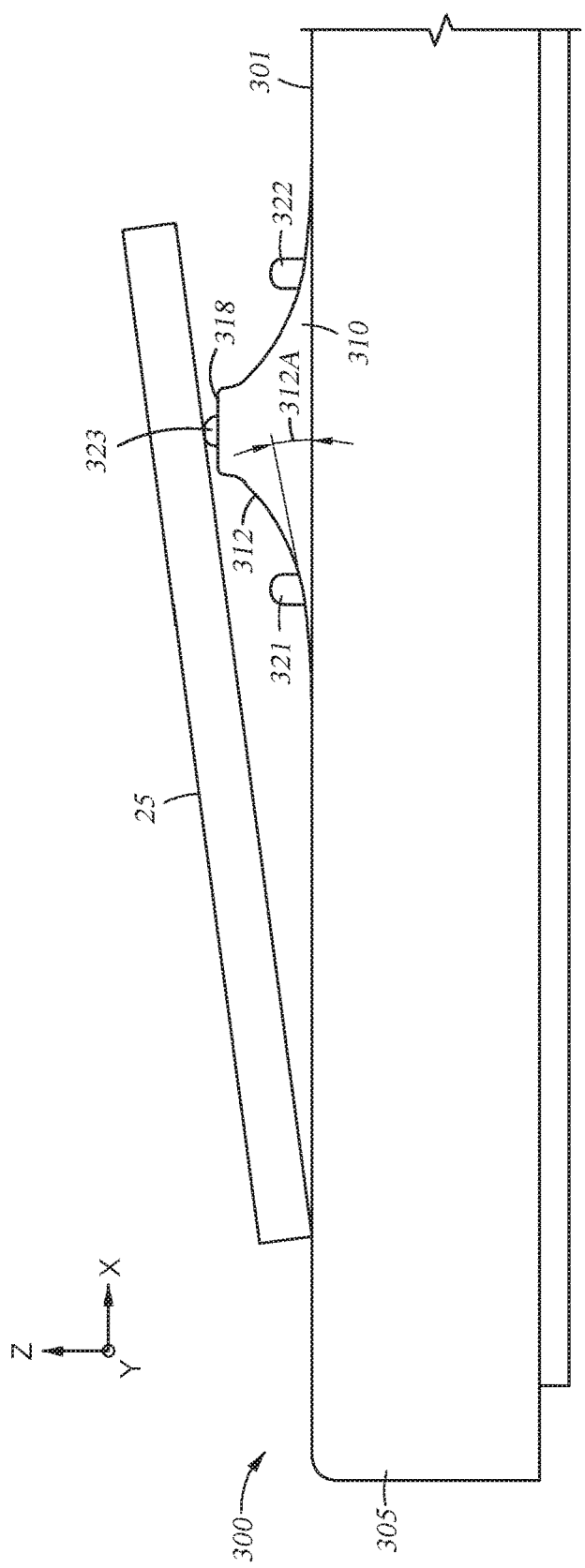
FIG. 1F is a side cross-sectional view of portions of the charging stand and an external object, according to one embodiment.

FIG. 1F is a side cross-sectional view of portions of the charging stand 300 and an external object 25, according to one embodiment. By placing the first contact pin 321 and the second contact pin 322 at a different position in the Z-direction and X and/or Y-directions relative to the third contact pin 323, a flat external object 25 can be prevented from causing an electrical short by preventing the contact between the external object 25 and the third contact pin 323 and the one or more base contact pins (e.g., first contact pin 321 and the second contact pin 322) simultaneously. The bump 310 has the shape of a truncated cone except for a top portion 318 proximate the top of the bump 310. The top portion 318 can have a shape of a cylinder, where the side 312 of the bump extends in a substantially vertical direction (i.e., the Z-direction in FIG. 1F). Excluding the top portion 318, the side 312 of the bump 310 can extend at an angle 312A relative to the first surface 301 from about 25° to about 55° relative to the Z-axis, such as from about 35° to about 45° relative to the Z-axis.

FIG. 2 is a side cross-sectional view of portions of a charging stand 400, according to another embodiment. Charging stand 400 is similar to the charging stand 300 described above except that the bump 310 is replaced with a differently shaped bump 410. The bump 410 has a convex surface 416. The convex surface 416 can prevent any portion of the third contact pin 323 from being within a direct line of sight of any portion of the first contact pin 321. Line 431 is a closest line of sight extending from the third contact pin 323 towards the first contact pin 321 to illustrate that the third contact pin 323 is not within a line of sight of the first contact pin 321. Similarly line 432 is a closest line of sight extending from the third contact pin 323 towards the second contact pin 322 to illustrate that the third contact pin 323 is not within a line of sight of the second contact pin 322. Thus, a flat surface of an external object cannot touch the third contact pin 323 and one or more of the first contact pin 321 and the second contact pin 322 simultaneously. Thus, the bump 410 having the convex surface 416 can further reduce the likelihood of an electrical short caused by an external object contacting both the third contact pin 323 and one or more of the first contact pin 321 and the second contact pin 322 simultaneously.

Figure 3:
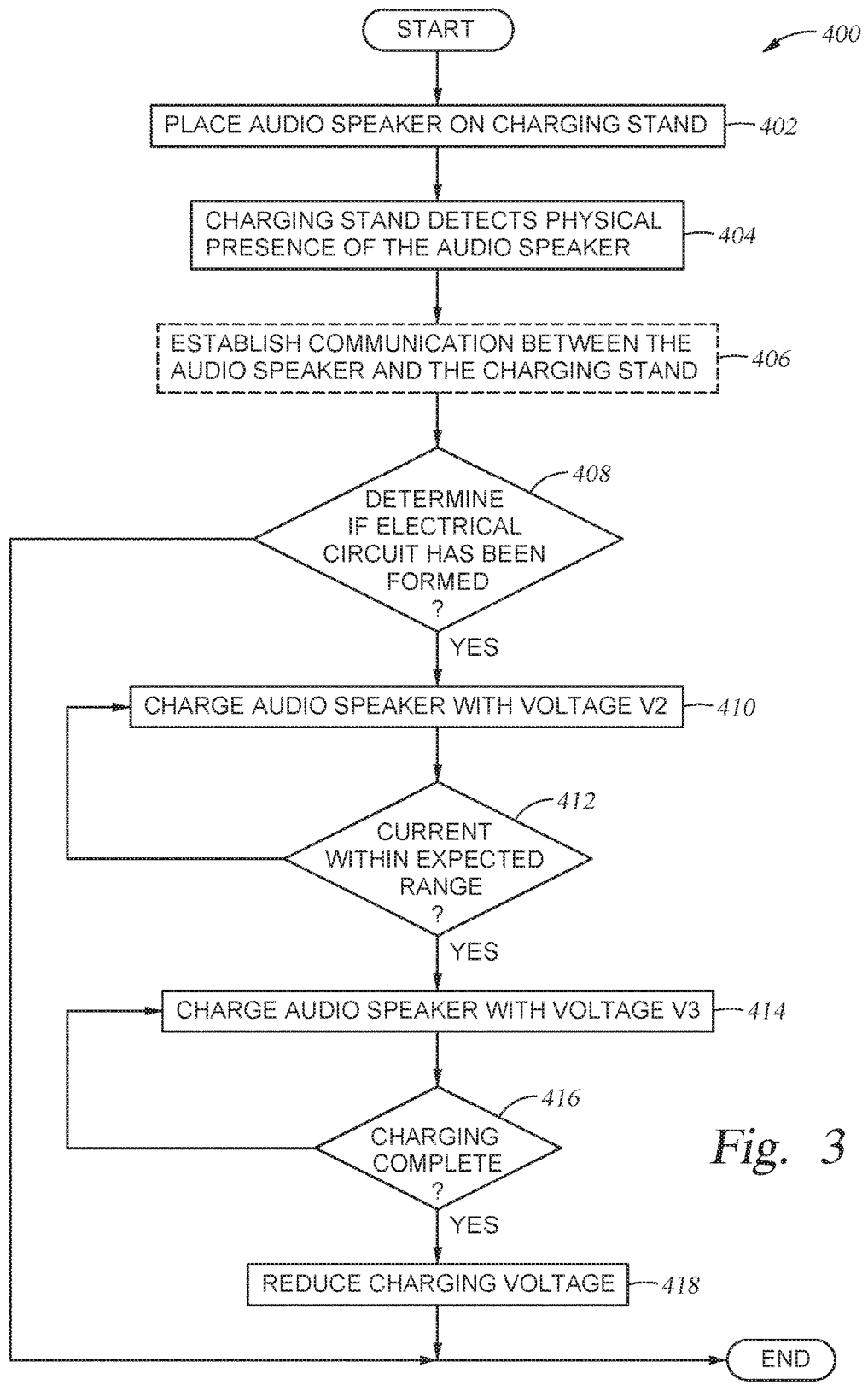
FIG. 3 is a process flow diagram of a method of charging the audio speaker with the charging stand, according to the embodiment of FIG. 1A.

FIG. 3 is a process flow diagram of a method 400 of charging the audio speaker 101 with the charging stand 300, according to the embodiment of FIG. 1A. Although the method 400 is described in reference to the blocks shown on FIG. 3, persons skilled in the art would understand that the method steps in other suitably adapted orders is also within the scope of the embodiments disclosed.

At block 402, the audio speaker 101 is positioned on the charging stand 300. For example, referring to FIG. 1C, the audio speaker 101 can be positioned so that the electrical connector 200 is placed over the bump 310 enabling the bump contact pin 323 to make electrical contact with the electrical contact 214 and also enabling the base 218 to make electrical contact with the base contact pins 321, 322.

At block 404, the one or more sensors 380 of the charging stand 300 can detect the presence of the audio speaker 101. For example, the one or more sensors 380 in the charging stand 300 may include one or more physical position sensors (not shown), such as a pressure or proximity sensor to determine when the audio speaker 101 is appropriately placed on the charging stand 300.

At block 406, communication can optionally be established between the audio speaker 101 and the charging stand 300. For example, in one embodiment, the audio speaker 101 can optionally be paired (e.g., a Bluetooth pairing) with the charging stand 300 to enable wireless communication between the audio speaker 101 and the charging stand 300.

At block 408, the charging stand 300 can determine that an electrical circuit appropriate for charging the audio speaker 101 has been created or formed between the bump contact pin 323 and the base contact pins 321, 322. For example, in one embodiment, the one or more sensors 380 can include a sensor to determine that an appropriate electrical circuit exists between the bump contact pin 323 and the base contact pins 321, 322 by detecting that current can flow through the formed circuit and/or by measuring the impedance between the output of the switching device 335 and ground of the power supply circuit 330. In cases where the appropriate circuit is not formed, the charging stand 300 may send a command prompt to the audio speaker 101, via the wireless communication link, that will then cause the processor in the audio speaker 101 to generate and cause the delivery of audio information to a user (e.g., tone(s)) to let the user know that the charging process cannot start due to the appropriate circuit not being formed.

At block 410, after the charging stand 300 confirms than an appropriate electrical circuit exists between the bump contact pin 323 and the base contact pins 321, 322, the charging stand 300 can begin charging the audio speaker 101 with the second voltage V2 (e.g., 5 V) as the output voltage Vout from the switching device 335. In some embodiments, the charging stand 300 can wait to receive a confirmation (e.g., a wireless confirmation) from the audio speaker 101 that the audio speaker 101 is ready to receive charging before supplying the second voltage V2 to charge the audio speaker 101.

At block 412, the charging stand 300 can use one of the one or more sensors 380 to measure the current being supplied to the audio speaker 101. The processor can then determine if the measured current is greater and/or less than one or more desired values stored in the memory of the charging stand 300. The process of determining that the current is greater than a certain value or is within an expected range can be used as an indicator that the audio speaker 101 is successfully being charged. In cases where the current is not within a desired range, or is above or below a desired first value stored in memory, the charging stand 300 may halt the charging process or remain at the second voltage V2 until the charging process has been completed or until the current reaches a desire value.

At block 414, after determining that the current is greater than a certain value or is within an expected range for a predetermined amount of time the charging stand 300 can provide the third voltage V3 as the output voltage Vout from the switching device 335 to more rapidly recharge the power source 135 in the audio speaker 101. In some embodiments, the charging stand 300 may confirm that the audio speaker 101 is capable of receiving a higher voltage for charging. For example, in one embodiment, the audio speaker 101 may send a wireless message to the charging stand to confirm that the audio speaker 101 can receive the higher voltage charging. In cases where the measured current is within a desired range within block 414, or is above or below a second value stored in memory, the charging stand 300 may continue to apply the third voltage V3. In cases where the measured current is not within a desired range within block 414, or is above or below a third value stored in memory, the charging stand 300 may continue on to block 416 or revert back to block 412.

At block 416, the charging stand 300 can determine when the audio speaker 101 is fully charged or removed from the charging stand. For example, in one embodiment, the audio speaker 101 can send a wireless message to the charging stand 300 to end the charging process when the audio speaker determines that the power source 135 is fully charged. In another embodiment, the charging stand 300 can determine that the audio speaker 101 is fully charged when the current being provided to the audio speaker 101, as sensed by one of the one or more sensors 380, drops below a predetermined level, such as the third value or a fourth value stored in memory.

At block 418, the charging stand 300 can reduce the output voltage Vout back to 0 V and the process of charging the audio speaker 101 can be halted. In some embodiments, the charging stand 300 may send a command prompt to the audio speaker 101, via the wireless communication link, that will then cause the audio speaker 101 to deliver audio information to a user to let the user know that the charging process has ended. In one example, the audio information delivered may include the delivery of one or more audible tones through the speaker, wherein the one or more tones are generated from information stored in the memory of the audio speaker 101.

While the foregoing is directed to embodiments of the present disclosure, other and further embodiments of the disclosure may be devised without departing from the basic scope thereof, and the scope thereof is determined by the claims that follow.

What is claimed is:

1. An electronic device, comprising:
   a housing enclosing an interior region, wherein the housing includes an opening;
   an onboard power source; and
   an electrical connector disposed in the opening, wherein the electrical connector comprises:
   a first portion extending outward through the opening, the first portion comprising:
   a core;
   an outer body disposed around the core, the outer body having a base;
   an inner recess, wherein the outer body is disposed around the inner recess; and
   an electrical contact disposed in the inner recess; and
   a second portion extending into the interior region of the housing, wherein the first portion is removably connected to the second portion, and the second portion electrically connects the first portion to the onboard power source.

2. The electronic device of claim 1, wherein the outer body extends from the base in a shape of a truncated cone.

3. The electronic device of claim 1, wherein the base of the outer body completely surrounds the inner recess.

4. The electronic device of claim 1, wherein the first portion is removably connected to the second portion using a threaded connection.

5. The electronic device of claim 1, wherein the electrical connector extends through the opening in a first direction, and the electrical contact and the base of the outer body are spaced apart in the first direction.

6. The electronic device of claim 1, wherein
   the first portion further comprises a first conductor and an injection molded first insulation disposed around the first conductor, and
   the second portion further comprises a second conductor and an injection molded second insulation disposed around the second conductor.

7. An electrical charging system comprising:
   an electronic device comprising:
   a housing enclosing an interior region, the housing including an opening;
   an onboard power source;
   an electrical connector disposed in the opening, the electrical connector comprising:
   a first portion extending outward through the opening, the first portion comprising:
   a core;
   an outer body disposed around the core, the outer body having a base;
   an inner recess, wherein the outer body is disposed around the inner recess; and an electrical contact disposed in the inner recess; and a second portion extending into the interior region of the housing, the first portion removably connected to second portion, wherein second portion electrically connects the first portion to the onboard power source; and a charging stand comprising:

a body having a first surface;

a bump having a top region and one or more sides, the one or more sides extending between the first surface and the top region;

one or more base contact pins that are coupled to the body, each base contact pin having an exposed end disposed at a first distance in a first direction from the first surface; and a bump contact pin extending from the top region of the bump, wherein the bump contact pin has an exposed end disposed a second distance in the first direction from the first surface, the second distance is greater than the first distance, the first direction is perpendicular to the first surface, and the bump contact pin contacts the electrical contact disposed in the inner recess when the electronic device is disposed on the charging stand.

8. The electrical charging system of claim 7, wherein the second portion of the electrical connector extends through the opening in the first direction, and the electrical contact and the base of the outer body of the first portion are spaced apart in the first direction.

9. The electrical charging system of claim 7, wherein the base of the outer body completely surrounds the inner recess.

10. The electrical charging system of claim 7, wherein the outer body extends from the base in a shape of a truncated cone.

11. The electrical charging system of claim 7, wherein the bump contact pin is not within a line of sight of the one or more base contact pins.

12. The electrical charging system of claim 7, wherein the one or more sides of the bump have a convex or concave shape.

* * * * *